United States Patent
Sugita

(10) Patent No.: US 8,169,755 B2
(45) Date of Patent: May 1, 2012

(54) POWER SUPPLY SYSTEM

(75) Inventor: Hideki Sugita, Chiyoda-ku (JP)

(73) Assignee: Mitsubishi Electric Corp., Tokyo (JP)

( * ) Notice: Subject to any disclaimer, the term of this patent is extended or adjusted under 35 U.S.C. 154(b) by 0 days.

(21) Appl. No.: 12/610,635

(22) Filed: Nov. 2, 2009

(65) Prior Publication Data
US 2010/0289336 A1 Nov. 18, 2010

(30) Foreign Application Priority Data
May 15, 2009 (JP) .................. 2009-118797

(51) Int. Cl.
H02H 7/06 (2006.01)
(52) U.S. Cl. .................................. 361/18
(58) Field of Classification Search ............ 361/18
See application file for complete search history.

(56) References Cited

U.S. PATENT DOCUMENTS

| 4,417,202 A * | 11/1983 | Pascoe ............... 324/509 |
| 4,755,737 A * | 7/1988 | Komurasaki et al. ....... 322/99 |
| 6,049,139 A * | 4/2000 | Nagaura et al. ............. 307/10.1 |
| 7,329,966 B2 * | 2/2008 | Konishi ................. 307/10.1 |
| 2003/0234634 A1 * | 12/2003 | Lee ..................... 323/241 |
| 2006/0097577 A1 * | 5/2006 | Kato et al. .............. 307/10.1 |
| 2008/0283115 A1 * | 11/2008 | Fukawa et al. ........... 136/246 |
| 2009/0009108 A1 * | 1/2009 | Hongo ................. 318/66 |
| 2010/0001523 A1 * | 1/2010 | Sato et al. .............. 290/31 |

FOREIGN PATENT DOCUMENTS
JP 2002-218646 A 8/2002
KR 2007014826 A * 2/2007

* cited by examiner

*Primary Examiner* — Rexford Barnie
*Assistant Examiner* — Ann Hoang
(74) *Attorney, Agent, or Firm* — Sughrue Mion, PLLC

(57) ABSTRACT

A power supply system is provided with devices of generating an electric power, controlling an amount of power generation, charging an electric power having been generated, converting an electric power having been generated, charging an electric power having been converted, operating an electric load by an electric power having been converted, and detecting a short-circuit fault of input/output of a DC converter. In the case of detecting an input/output short-circuit fault of the DC converter, from the input/output short-circuit detector to the generator controller, an instruction is given such that the generator is switched to make a power generation at a predetermined constant voltage determined based on a voltage of the circuit arrangement.

7 Claims, 10 Drawing Sheets

POWER SUPPLY SYSTEM

BACKGROUND OF THE INVENTION

1. Field of the Invention

The present invention relates to a power supply system having two charge systems and, more particularly, to a power supply system that can continue to supply an electric power to an electric load or a power source apparatus of vehicles even on the occasion of occurrence of any fault in components.

2. Description of the Related Arts

In hybrid cars or idling stop cars, as compared with conventional engine cars, it is necessary to charge a more electric power. Therefore, an arrangement has been proposed, and in which a generator is made to be of high output, a generated power thereof is charged in a high-voltage battery, and an electric power having been generated by this high-output generator is fed to an electric load in a low-voltage system of vehicles via a DC converter.

However, in such an arrangement in which high-voltage system and low-voltage system are connected together via a DC converter, in the case of occurrence of any fault in the DC converter, not only power feed to an electric load in the low-voltage system cannot continue, but also the breakdown of an electric load in the low-voltage system may be induced. Therefore, several attempts related to measures against the fault of the DC converter have been conventionally proposed. For example, a method has been proposed, and in which in the case of occurrence of a short circuit fault at the DC converter, by stopping the power generation of a generator or by reducing the amount of power generation, an electric load or a power source apparatus in the low-voltage system is protected. (For example, refer to the Japanese Patent Publication (unexamined) No. 218646/2002).

In the above-mentioned Japanese Patent Publication (unexamined) No. 218646/2002, however, only measures in the case of occurrence of a short circuit fault at the DC converter is proposed, but a fault mode of the DC converter is not limited to this one. For example, due to any fault in an internal part of the DC converter, there is a mode in which an output comes to over-voltage or a mode in which an output comes to over-current. In the case of occurrence of these fault modes at the DC converter, since an electric power of not less than a rating is applied to an electric load or a power source apparatus in the low-voltage system, this case likely to result in the deteriorated performance due to over load or, at worst, their destruction.

Furthermore, other than the faults of the DC converter, for example, measures in the case of occurrence of any error in components forming a high-voltage power source system are needed in order to protect an electric load or a power source apparatus as well. For example, in the case of occurrence of a short circuit fault at the power source apparatus, there is a possibility that the power sources system of vehicles is brought in a short circuit thereby causing inoperative of the electric load. In the above-mentioned Japanese Patent Publication (unexamined) No. 218646/2002, there is no description at all as to the fault modes against which measures have to be made other than faults at the DC converter. In addition, the Japanese Patent Publication (unexamined) No. 218646/2002 proposes an attempt of reduction of the amount of power generated at a generator in the case of occurrence of the short circuit fault at the DC converter. However, in the case that the amount of power generation is reduced to a voltage value lower than the voltage in the low-voltage system, since an electric power cannot be fed via the DC converter, the foregoing proposal cannot be said effective.

SUMMARY OF THE INVENTION

The present invention has an object of providing a power supply system capable of solving the above-discussed problems, properly addressing other faults including the short circuit fault of a DC converter, as well as capable of protecting an electric load or a power source apparatus in the low-voltage system and continuing operation necessary as the DC converter even on the occasion of fault detection of components forming a power source system.

To accomplish the foregoing object, the present invention according to the first aspect of the invention is a power supply system including devices for generating an electric power, controlling an amount of power generation, charging an electric power having been generated, converting an electric power having been generated, charging an electric power having been converted, operating an electric load by an electric power having been converted, and detecting a short-circuit fault of input/output of a DC converter. In this power supply system, when said input/output short-circuit detector detects an input/output short-circuit fault of said DC converter, an instruction is given from said input/output short-circuit detector to said generator controller such that said generator is switched to make a power generation at a predetermined constant voltage to be determined based on a voltage of said second circuit arrangement.

The invention according to the second aspect of the invention is a power supply system including devices for generating an electric power, controlling an amount of power generation, charging an electric power having been generated, converting an electric power having been generated, charging an electric power having been converted, operating an electric load by an electric power having been converted, and detecting an output over-voltage from a DC converter. In this power supply system, when said output over-voltage detector detects an output over-voltage of said DC converter, an instruction is given from said output over-voltage detector to said generator controller such that said generator is switched to make a power generation at a predetermined constant voltage to be determined based on a voltage of said second circuit arrangement, or an instruction is given such that a power generation of said generator is stopped or an amount of power generation is reduced.

The present invention according to the third aspect of the invention is a power supply system including devices for generating an electric power, controlling an amount of power generation, charging an electric power having been generated, converting an electric power having been generated, charging an electric power having been converted, operating an electric load by an electric power having been converted, and detecting an output over-current from a DC converter. In this power supply system, when said output over-current detector detects an output over-current of said DC converter, an instruction is given from said output over-voltage detector to said generator controller such that said generator is switched to make a power generation at a predetermined constant voltage to be determined based on a voltage of said second circuit arrangement, or an instruction is given such that a power generation of said generator is stopped or an amount of power generation is reduced.

The invention according to the fourth aspect of the invention is a power supply system including devices for generating an electric power, controlling an amount of power generation, charging an electric power having been generated, converting an electric power having been generated, charging an electric power having been converted, operating an electric load by an electric power having been converted, and detecting an over heat of a DC converter. In this power supply system, when said over-heat detector detects an over heat of said DC converter, an instruction is given from said over-heat detector to said generator controller such that said generator is switched to make a power generation at a predetermined constant voltage to be determined based on a voltage of said second circuit arrangement, or an instruction is given such that a power generation of said generator is stopped or an amount of power generation is reduced.

The invention according to the fifth aspect of the invention is a power supply system including devices for generating an electric power, controlling an amount of power generation, charging an electric power having been generated, converting an electric power having been generated, charging an electric power having been converted, operating an electric load by an electric power having been converted, and detecting an open-circuit fault at a positive pole or negative pole of a power source apparatus charging an electric power having been generated at a generator. In this power supply system, when said open-circuit fault detector detects an open-circuit fault at a positive pole or negative pole of said first power source apparatus, an instruction is given from said open-circuit fault detector to said generator controller such that said generator is switched to make a power generation at a predetermined constant voltage to be determined based on a voltage of said second circuit arrangement is made, or an instruction is given such that a power generation of said generator is stopped or an amount of power generation is reduced.

The invention according to the sixth aspect of the invention is a power supply system including devices for generating an electric power, controlling an amount of power generation, charging an electric power having been generated, converting an electric power having been generated, charging an electric power having been converted, operating an electric load by an electric power having been converted, and detecting a short-circuit fault of a power source apparatus charging an electric power having been generated at a generator. In this power supply system, when said short-circuit fault detector detects a short-circuit fault of said first power source apparatus, an instruction is given from said short-circuit fault detector to said generator controller such that a power generation of said generator is stopped.

The invention according to the seventh aspect of the invention is a power supply system including devices for generating an electric power, controlling an amount of power generation, charging an electric power having been generated, converting an electric power having been generated, charging an electric power having been converted, operating an electric load by an electric power having been converted, and detecting a ground fault at a positive pole of a power source apparatus charging an electric power having been generated at a generator. In this power supply system, when said ground fault detector detects a ground fault at a positive pole of said first power source apparatus, an instruction is given from said ground fault detector to said generator controller such that a power generation of said generator is stopped.

The invention according to the eighth aspect of the invention is a power supply system including devices for generating an electric power, controlling an amount of power generation, charging an electric power having been generated, converting an electric power having been generated, charging an electric power having been converted, and operating an electric load by the electric power having been converted. This power supply system is provided with a back flow preventing device for preventing a back flow of an electric power from on output side of the DC converter to an input side of the DC converter.

As a result of employing the above-mentioned arrangement, owing to that in the case of detection of the input/output short-circuit of the DC converter, the generator is switched to make a power generation at a predetermined constant voltage based on the voltage in the low-voltage system, it is possible to reliably feed an electric power from the high-voltage system to the low-voltage system via the DC converter while preventing the application of a high voltage to the low-voltage system via the DC converter; as well as it is possible to prevent situation of deterioration of the power source apparatus and eventually inoperative of the electric load due to that a required electric power is fed to an electric load using only the power source apparatus on the low-voltage system side.

Further, owing to that in the case of detection of the output over-voltage, output over-current or over heat of the DC converter or the open-circuit fault at the positive pole or negative pole of the power source apparatus on the high-voltage system side, the generator is switched to make a power generation at a predetermined constant voltage based on the voltage in the low-voltage system, or the power generation of the generator is stopped or the amount of power generation is reduced, it is possible to prevent the over-load on the electric load or the power source apparatus in the low-voltage system and the resultant reduction in function thereof and eventually the destruction; as well as it is possible to prevent the fault of the DC converter due to output over-voltage, and the resultant reduction in function thereof or inoperative of the electric load. It is further possible to prevent situation of deterioration of a power source apparatus and eventually inoperative of an electric load due to that a required electric power is fed to the electric load using only the power source apparatus on the low-voltage system side.

Furthermore, owing to that in the case of detection of the short-circuit fault of the power source apparatus or the short-circuit fault at the positive pole and negative pole of the power source apparatus on the high-voltage system side, and the ground fault at the positive pole of the power source apparatus on the high-voltage system side, the power generation of the generator is stopped, and it is possible to prevent situation of the short circuit in the power source system by the conduction of power generation of the generator.

Furthermore, by preventing the back flow of electric power from the low-voltage system to the high-voltage system via the DC converter, in the case that the electric potential of the power source apparatus on the low-voltage system side is higher than that of the power source apparatus on the high-voltage system side, it is possible to prevent situation that an electric power unnecessarily flows from the low-voltage system to the high-voltage system whereby the power supply to an electric load is insufficient and thus the operation of the electric load comes to be unstable; as well as in the case that the power source system is brought in the short circuit due to any fault of the power source apparatus on the high-voltage system side, it is possible to separate the high-voltage system side, thereby protecting the low-voltage system to continue the operation of the electric load.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Embodiment 1

Figure 1:
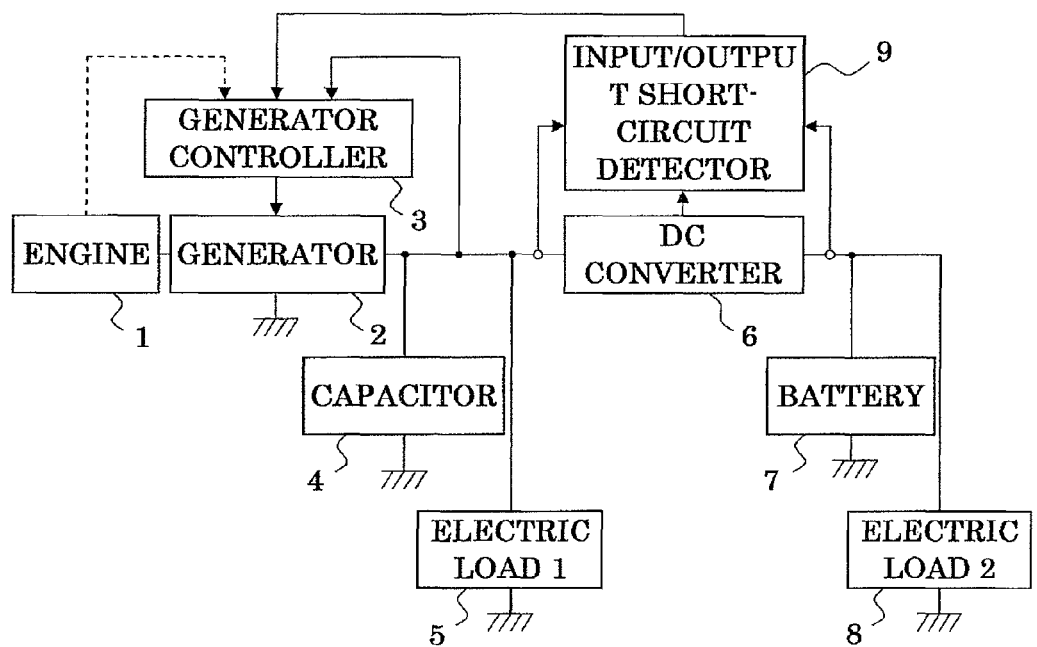
FIG. 1 is a schematic diagram of processing in the first embodiment.

A first preferred embodiment according to the present invention is hereinafter described referring to the drawings. In the drawings, reference numeral 1 designates an engine generating a power of vehicles, numeral 2 designates a generator that is connected to the engine to generate an electric power, numeral 3 designates a generator controller acting to control the amount of power generated at the generator based on an output voltage of the generator, numeral 4 designates a capacitor acting to charge an electric power having been generated at the generator, numeral 5 designates an electric load 1 to operate by an electric power having been generated at the generator, numeral 6 designates a DC converter acting to convert an electric power having been generated at the generator, numeral 7 designates a battery acting to charge an electric power having been converted at the DC converter, numeral 8 designates an electric load 2 to operate by an electric power having been converted at the DC converter, numeral 9 designates an input/output short-circuit detector acting to detect the short-circuit fault of input/output of the DC converter and, from results thereof, to give an instruction to the generator controller 3.

Incidentally, although an internal combustion engine or other power sources to drive a generator is assumed to be an engine in this embodiment, means for use is not limited to these ones, but may be other means. Further, although a capacitor is assumed to be used as a first power source apparatus and a battery is assumed to be used as a second power source apparatus in this embodiment, means for use is not limited to these ones, but may be other means. Furthermore, although the electric load 1 is included on the generator side, this electric load 1 may not necessarily be included as a component. Further, the amount of power generated at the generator may be adjusted in accordance with the engine speed of an engine. The same assumptions are also made in other embodiments to be described hereinafter.

Figure 2:
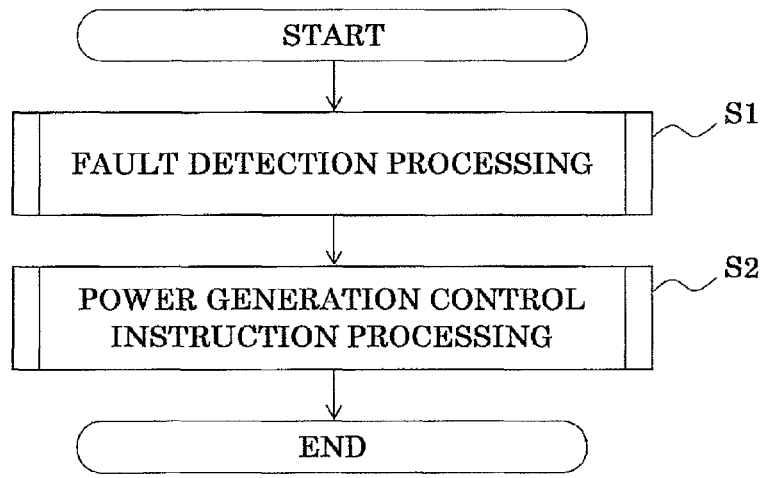
FIG. 2 is a flowchart of a processing procedure in the first embodiment.
Figure 3:
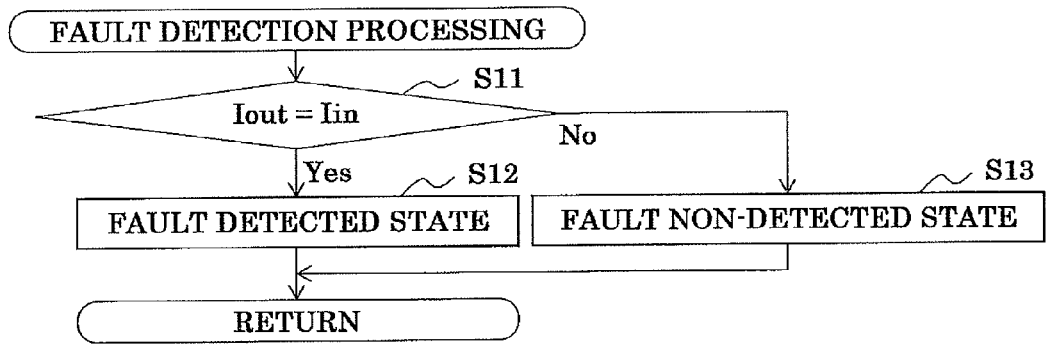
FIG. 3 is a flowchart of fault detection processing in the first embodiment.

Now, operations of this circuit arrangement are described with reference to FIG. 2 which is a flowchart showing a schematic processing procedure of the input/output short-circuit detector 9 in this embodiment. First, the input/output short-circuit fault of the DC converter 6 is detected in fault detection processing S1, and based on the result thereof, a power generation instruction to the generator controller 3 is determined in power generation control instruction processing S2. FIG. 3 is a flowchart showing a processing procedure of the above-mentioned fault detection processing S1.

In this embodiment, first, comparison is made (S 11) between an input current Iin and an output current Iout of the DC converter 6, and in the case of coincidence, the input/output short-circuit fault of the DC converter 6 is determined to occur and it is set to be in the state of fault detection (S 12). In the case that the input current Iin and output current Iout of the DC converter 6 are not in coincidence, the DC converter 6 is determined operating normally and it is set to be in the state of no fault detection (S13). Incidentally, although the input/output short-circuit fault is detected from the input current Iin and the output current Iout of the DC converter 6 in this embodiment, means for use in input/output short-circuit detection is not limited to this one, but may be other means.

Figure 4:
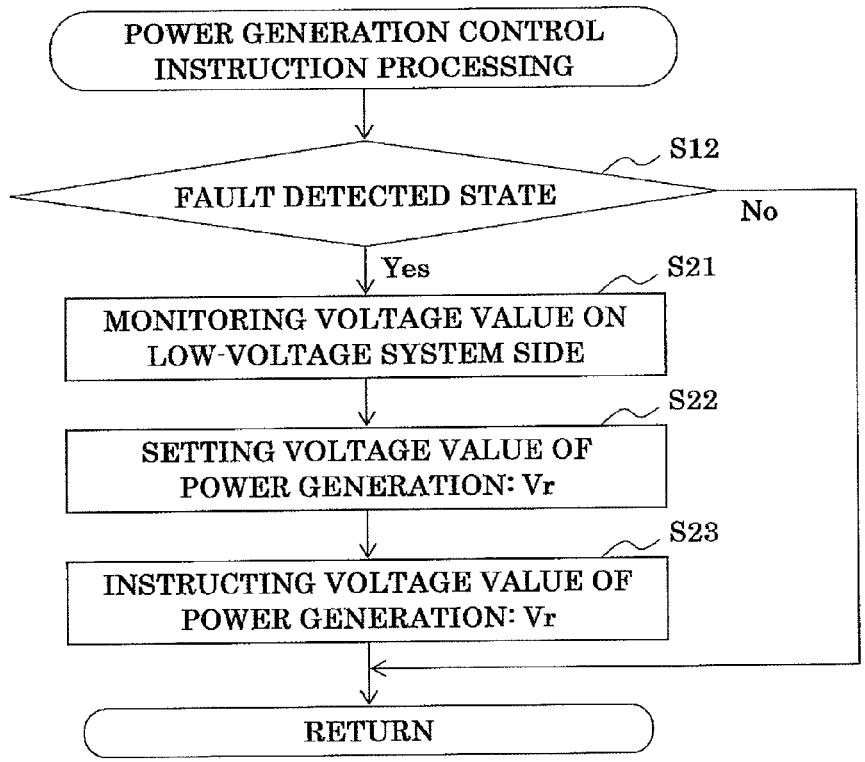
FIG. 4 is a flowchart of power generation control instruction processing in the first embodiment.

FIG. 4 is a flowchart showing a processing procedure of power generation control instruction processing S2 to be executed after the above-mentioned fault detection processing S1. In the case that the state of fault detection S12 is determined being in the state of fault detection processing S1, the voltage value on the low-voltage system side, being an output terminal side of the DC converter 6, is monitored (S21), and based thereon, a power generation voltage value Vr of the generator 2 is set (S22). Further, such an instruction as to make a constant power generation at this power generation voltage value Vr is given to the generator controller (S23).

By processing as described above, owing to that the input/output short-circuit of the DC converter is detected and that in the case of detection of the input/output short circuit of the DC converter, the generator is switched to make a power generation at a predetermined constant voltage based on the voltage in the low-voltage system, it is possible to reliably feed an electric power from the high-voltage system to the low-voltage system via the DC converter while preventing the application of a high voltage to the low-voltage system via the DC converter; as well as it is possible to prevent situation of the deterioration of a power source apparatus and eventually inoperative of an electric load due to that a required electric power is fed to an electric load using only the power source apparatus on the low-voltage system side.

Embodiment 2

Figure 5:
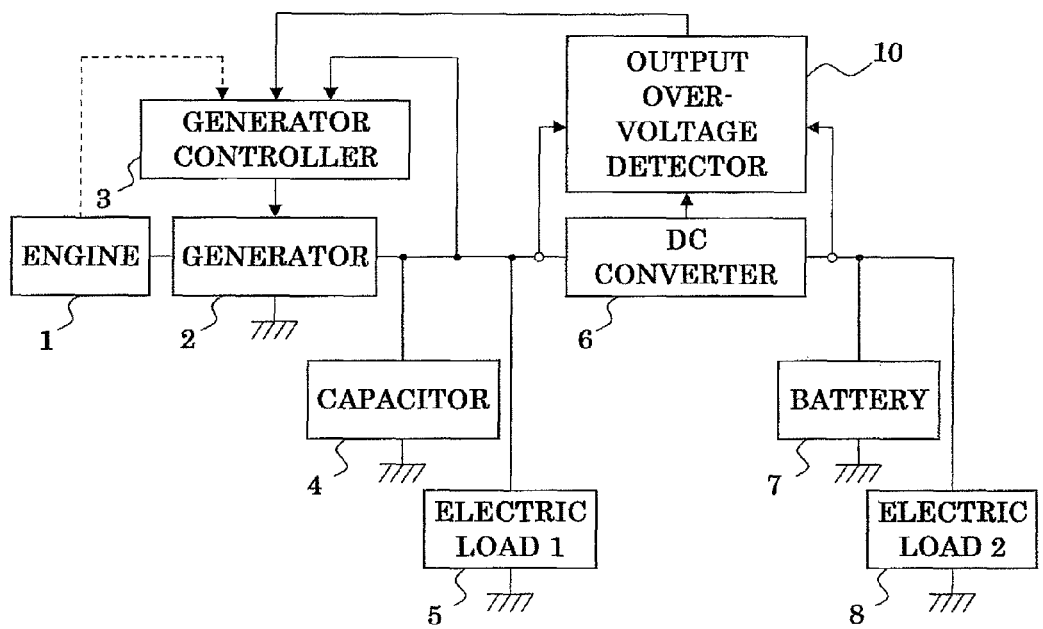
FIG. 5 is a processing schematic diagram in the second embodiment.

A second embodiment according to the present invention is hereinafter described with reference to FIG. 5. In the drawings, the same reference numerals designate like parts as in FIG. 1. Reference numeral 10 designates an output over-voltage detector detecting output over-voltage of the DC converter 6, and from result of the detection, giving an instruction to the generator controller 3.

Figure 6:
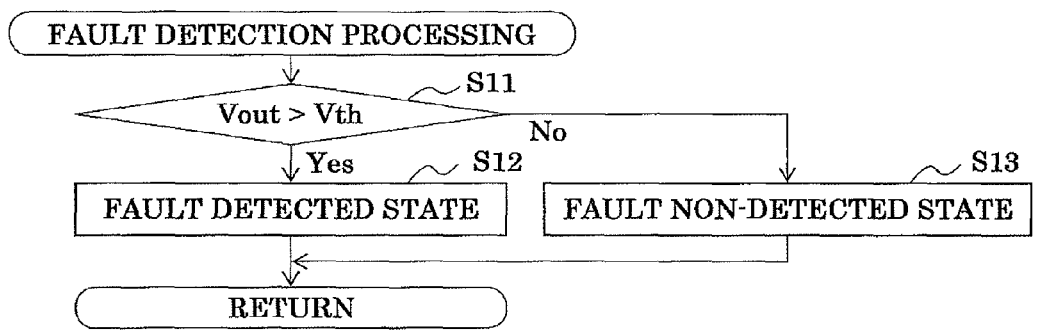
FIG. 6 is a flowchart of fault detection processing in the second embodiment.

Now, operations are described. In this embodiment, the schematic processing procedure of the above-mentioned output over-voltage detector 10 is the same as in the procedure shown in FIG. 2 of the first embodiment, and is a basic concept common to that of other embodiments. FIG. 6 is a flowchart showing the schematic processing procedure of fault detection processing. In this embodiment, comparison is made between an output voltage Vout and a predetermined threshold Vth of the DC converter 6 (S11), and in the case that the output voltage Vout is larger than the above-mentioned threshold Vth, the output from the DC converter is determined to be at over-voltage and it is set to be in the state of fault detection (S 12). In the case that the output voltage Vout of the DC converter is not more than the threshold Vth, the DC converter is determined operating normally and it is set to be in the state of no fault detection (S 13). Incidentally, although output over-voltage is to be detected from the output voltage and a predetermined threshold of the DC converter in this embodiment, means for use in detecting output over-voltage is not limited to this one.

Figure 7:
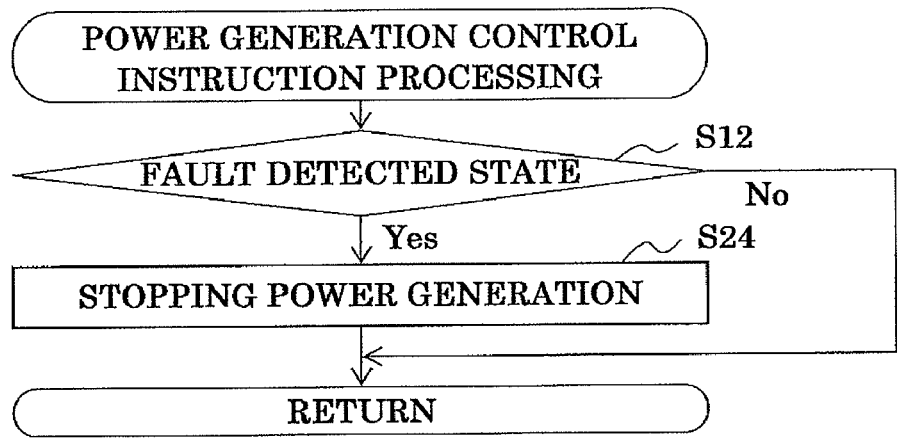
FIG. 7 is a flowchart of power generation control instruction processing in the second embodiment.

After the fault detection processing, operation goes to power generation control instruction processing. FIG. 7 is a flowchart showing the schematic processing procedure of power generation control instruction processing. In the case that it is determined to be in the state of fault detection in the fault detection processing (S12), such an instruction as to stop the power generation of the generator is given to the generator controller (S24).

Figure 8:
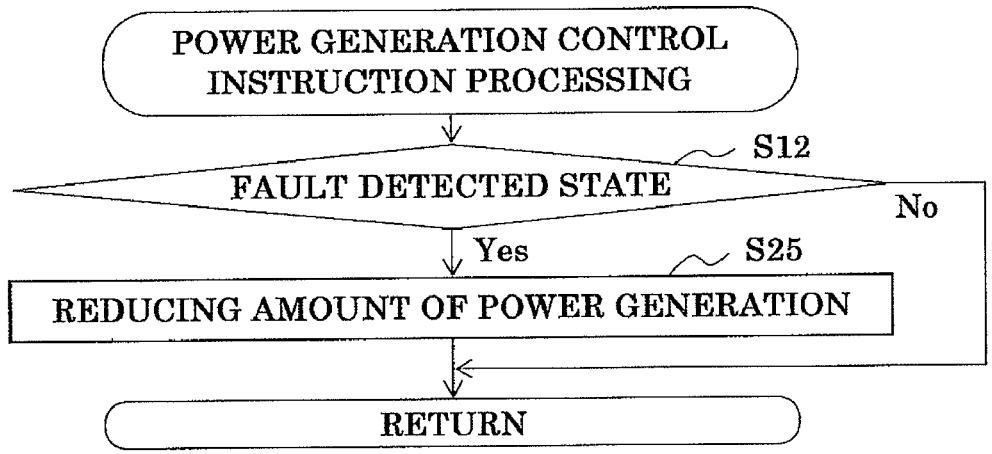
FIG. 8 is a flowchart of power generation control instruction processing in the second embodiment.

In addition, as is illustrated in FIG. 8, in the case that it is determined to be in the state of fault detection (S12) in the fault detection processing, the amount of power generated at the generator may be arranged to be reduced (S25). Incidentally, the procedure of power generation control instruction processing is not limited to stop the power generation or to reduce the amount of power generation as in the above-mentioned FIGS. 7 and 8, but it is preferable to adopt a procedure of keeping a predetermined constant voltage value as is illustrated in FIG. 4 of the above-mentioned first embodiment.

By processing as described above, owing to that output over-voltage of the DC converter is detected and that in the case of detection of output over-voltage of the DC converter, the power generation of the generator is stopped or the amount of power generation is reduced, it is possible to prevent over-load onto an electric load or a power source apparatus in the low-voltage system, and the resultant reduction of function and eventually the destruction; as well as it is possible to prevent the fault of the DC converter owing to output over-voltage and the resultant reduction of function or inoperative of an electric load. In addition, by switching to the power generation at predetermined constant voltage, it is possible to reliably feed an electric power from the high-voltage system to the low-voltage system via the DC converter while preventing the application of a high voltage to the low-voltage system via the DC converter; as well as it is possible to prevent situation of the deterioration of a power source apparatus and eventually inoperative of an electric load due to that a required electric power is fed to the electric load using only the power source apparatus on the low-voltage system side.

Embodiment 3

Figure 9:
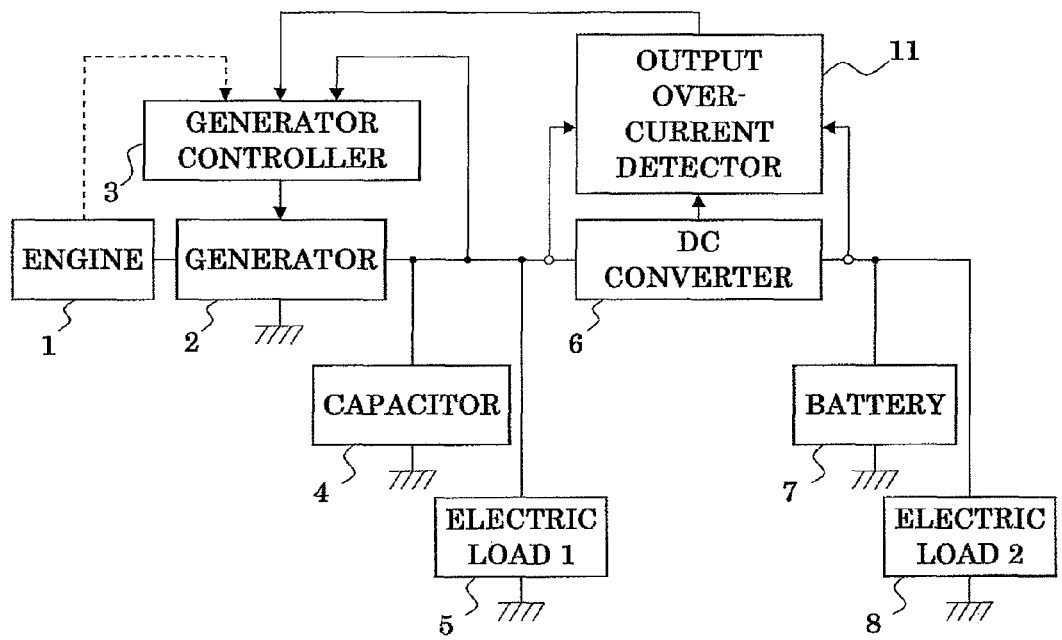
FIG. 9 is a schematic diagram of processing in the third embodiment.

A third embodiment according to the present invention is hereinafter described with reference to FIG. 9 showing a processing schematic diagram of this embodiment. In the drawings, the same reference numerals designate like parts as in FIG. 1. Reference numeral 11 designates an output over-current detector detecting output over-current of the DC converter 6, and from results thereof, giving an instruction to the generator controller 3.

Figure 10:
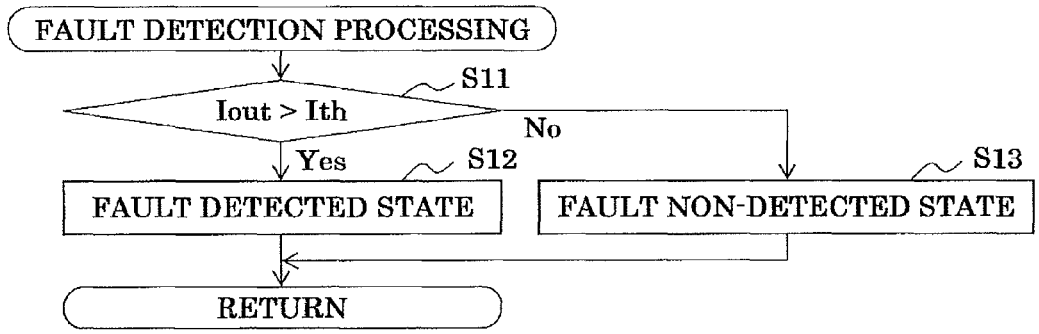
FIG. 10 is a flowchart of fault detection processing in the third embodiment.

Now, operations are described. FIG. 10 is a flowchart of showing the schematic processing procedure of fault detection processing. In this embodiment, comparison is made between an output current Iout from the DC converter and a predetermined threshold Ith (S11), and in the case that the output current Iout is larger than the threshold Ith, the output from the DC converter is determined to be in over-current and it is set to be in the state of fault detection (S12). In the case that the output current Iout from the DC converter is not more than the threshold Ith, the DC converter is determined operating normally and it is set to be in the state of no fault detection (S 13). Incidentally, although output over-current is detected from the output current from the DC converter and a predetermined threshold in this embodiment, means for use in detecting output over-current is not limited to this one, but may be other means.

After the fault detection processing, operation goes to power generation control instruction processing, and the processing procedure of power generation control instruction processing in this case is the same as in the flowcharts of FIGS. 4, 7 and 8 showing the first and second embodiments. That is, in the case that it is determined to be in the state of fault detection in fault detection processing, an instruction is given so as to keep a predetermined constant voltage value, or an instruction is given to the generator controller so as to stop the power generation of the generator or an instruction is given so as to reduce the amount of power generated at the generator.

By processing as described above, owing to that output over-current of the DC converter is detected and that in the case of detection of output over-current of the DC converter, the generator is switched to make a power generation at a predetermined constant voltage based on the voltage in the low-voltage system, the power generation of the generator is stopped, or the amount of power generation is reduced, it is possible to prevent over-load on an electric load or a power source apparatus in the low-voltage system, and the resultant reduction of function and eventually the destruction; as well as it is possible to prevent the fault of the DC converter due to output over-current and the resultant reduction of function or inoperative of the electric load. In addition, by switching to the power generation at predetermined constant voltage, it is possible to reliably feed an electric power from the high-voltage system to the low-voltage system via the DC converter while preventing the application of a high voltage to the low-voltage system via the DC converter; as well as it is possible to prevent situation of the deterioration of a power source apparatus and eventually inoperative of an electric load due to that a required electric power is fed to the electric load using only the power source apparatus on the low-voltage system side.

Embodiment 4

Figure 11:
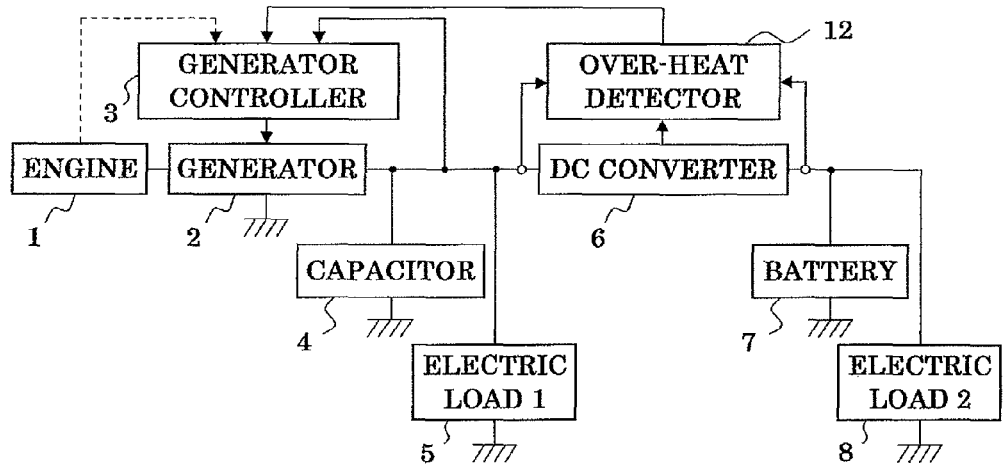
FIG. 11 is a schematic diagram of processing in the fourth embodiment.

Now, a fourth embodiment according to the present invention is described with reference to FIG. 11 showing a processing schematic diagram of this embodiment. In the drawings, the same reference numerals designate like parts as in FIG. 1. Reference numeral 12 designates an over-heat detector detecting over-heat of the DC converter 6, and from results thereof, giving an instruction to the generator controller 3.

Figure 12:
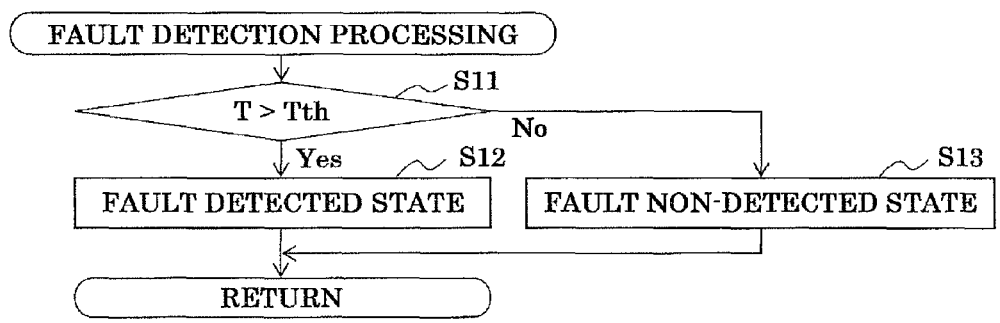
FIG. 12 is a flowchart of fault detection processing in the fourth embodiment.

Now, operations are described. FIG. 12 is a flowchart showing the schematic processing procedure of the over-heat detector in this embodiment. In this embodiment, comparison is made between a measured temperature T of the DC converter and a predetermined threshold Tth (S11), and in the case that the measured temperature T is larger than the threshold Tth, the DC converter is determined to be in the state of over-heat and it is set to be in the state of fault detection (S12). In the case that the measured temperature T of the DC converter is not more than the threshold Tth, the DC converter is determined operating normally and it is set to be in the state of no fault detection (S13). Incidentally, although the over-heat state is to be detected from the measured temperature of the DC converter and a predetermined threshold in this embodiment, means for use in detecting the over-heat state is not limited to this one, but may be other means.

After the fault detection processing, operation goes to power generation control instruction processing, and also in this case, the processing procedure of power generation control instruction processing is the same as in the flowcharts of FIGS. 4, 7 and 8 showing the first and second embodiments, such that further description thereof is omitted.

By processing as described above, owing to that over-heat of the DC converter is detected, and in the case of over-heat detection of the DC converter, the generator is switched to make a power generation at a predetermined constant voltage based on the voltage in the low-voltage system, the power generation of the generator is stopped, or the amount of power generation is reduced, it is possible to prevent the fault of the DC converter due to over-heat, and the resultant reduction of function or inoperative of an electric load. Furthermore, by switching to the power generation at predetermined constant voltage, it is possible to reliably feed an electric power from the high-voltage system to the low-voltage system via the DC converter while preventing the application of a high voltage to the low-voltage system via the DC converter; as well as it is possible to prevent situation of the deterioration of a power source apparatus and eventually inoperative an electric load due to that a required electric power is fed to the electric load using only the power source apparatus on the low-voltage system side.

Embodiment 5

Figure 13:
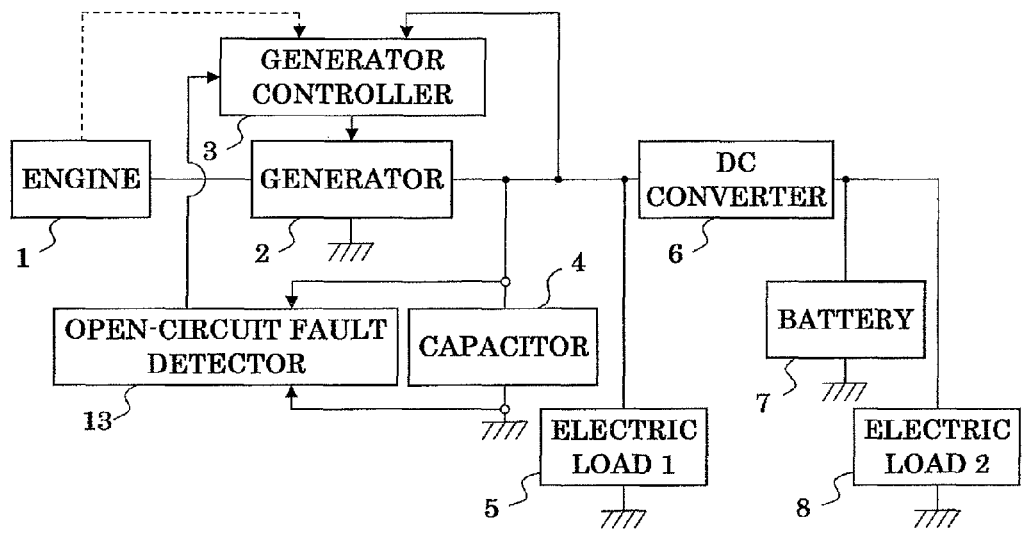
FIG. 13 is a schematic diagram of processing in the fifth embodiment.

Now, a fifth embodiment according to the present invention is described with reference to FIG. 13 showing a processing schematic diagram in the case of occurrence of any fault on the DC power source side of this embodiment. In the drawings, the same reference numerals designate like parts as in FIG. 1. Reference numeral 13 designates an open-circuit fault detector detecting open-circuit fault at a positive pole or negative pole of the capacitor 4, and from results thereof, giving an instruction to the generator controller 3.

Figure 14:
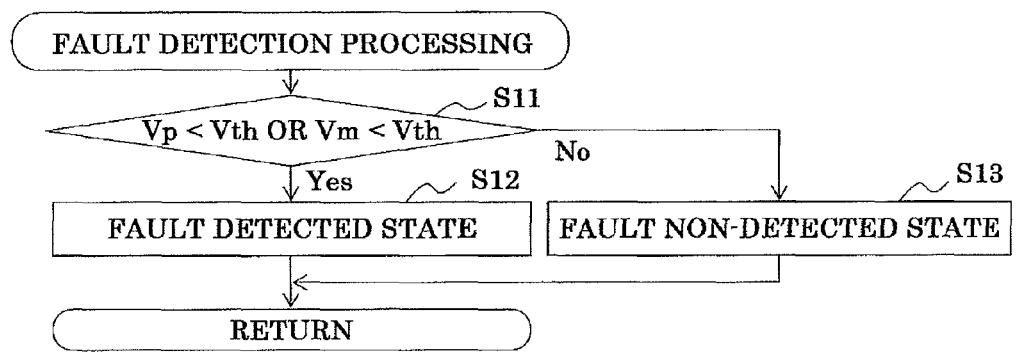
FIG. 14 is a flowchart of fault detection processing in the fifth embodiment.

Now, operations are described. FIG. 14 is a flowchart showing a schematic processing procedure of the open-circuit fault detector in this embodiment. In this embodiment, comparison is made between a positive pole-side voltage Vp and negative pole-side voltage Vm of the capacitor, and a predetermined threshold Vth (S11), and in the case that either the positive pole-side voltage Vp or the negative pole-side voltage Vm is less than the threshold Vth, the open-circuit fault is determined to occur at the capacitor and it is set to be in the state of fault detection (S12). In the case that both the positive pole-side voltage Vp and the negative pole-side voltage Vm are not less than the threshold Vth, the capacitor is determined operating normally and it is set to be in the state of no fault detection (S13). Incidentally, although the open-circuit fault is to be detected from the positive pole-side voltage and negative pole-side voltage of the capacitor and a predetermined threshold in this embodiment, means for use in detecting the open circuit fault of the capacitor is not limited to this one, but may be other means.

After the fault detection processing, operation goes to power generation control instruction processing, and also in this case, the processing procedure of power generation control instruction processing is the same as in the flowcharts of FIGS. 4, 7 and 8 showing the first and second embodiments.

By processing as described above, owing to that in the case of detection of the open-circuit fault at the positive pole or the negative pole of the power source apparatus on the high-voltage system side, the generator is switched to make a power generation at a predetermined constant voltage based on the voltage in the low-voltage system, the power generation of the generator is stopped, or the amount of power generation is reduced, it is possible to suppress the unnecessary power consumption due to the power generation under the situation that an electric power cannot be charged in the power source apparatus, and to suppress deteriorated running performance accompanied by the occurrence of reduced torque by power generation; as well as it is possible to prevent situation of the deterioration of a power source apparatus and eventually inoperative of an electric load due to that a required electric power is fed to an electric load using only the power source apparatus on the low-voltage system side.

As is described one-by-one in the foregoing embodiments, owing to that the input/output short-circuit, output over-voltage, output over-current or over-heat of the DC converter, or the open-circuit fault at the positive pole or negative pole of the power source apparatus on the high-voltage system side is detected, and in the case of detection of these faults, the generator is switched to make a power generation at a predetermined constant voltage based on the voltage in the low-voltage system and an electric power is reliably fed from the high-voltage system to the low-voltage system via the DC converter, and the power generation of the generator is stopped or the amount of power generation is reduced, it is possible to prevent the over-load onto an electric load or a power source apparatus in the low-voltage system, and the resultant reduction of function and eventually the destruction; as well as it is possible to prevent the fault of the DC converter, and the resultant reduction of function or inoperative of the electric load.

Embodiment 6

Figure 15:
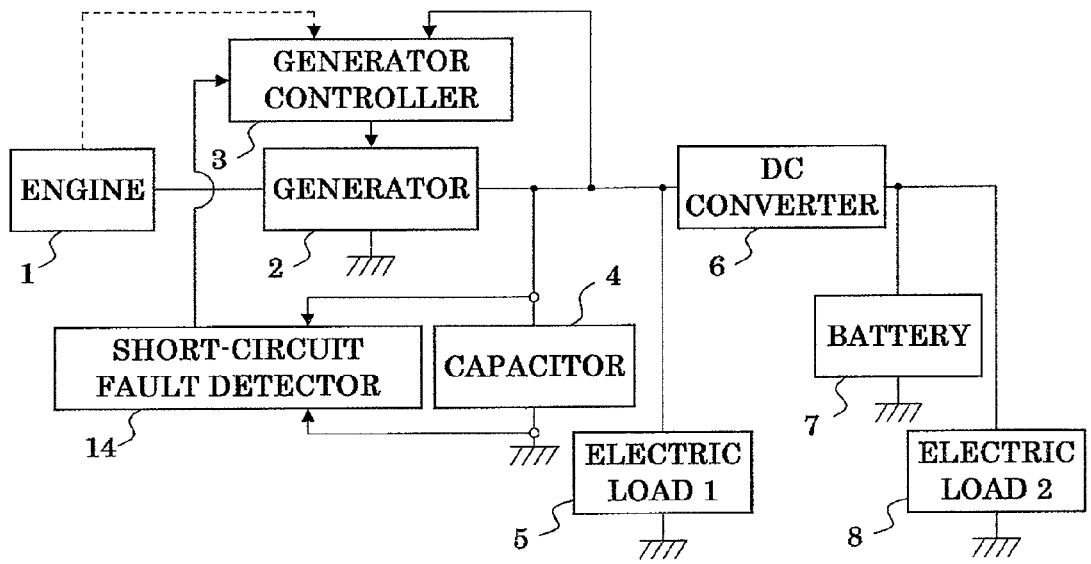
FIG. 15 is a schematic diagram of processing in the sixth embodiment.

Now, a sixth embodiment according to the present invention is described referring to the drawings. FIG. 15 is a processing schematic diagram of this embodiment. In the drawings, the same reference numerals designate like parts as in FIG. 1. Reference numeral 14 designates a short-circuit fault detector acting to give an instruction to the generator controller 3, in the case of detection of the short-circuit fault of the capacitor 4 or the short-circuit fault at the positive pole and negative pole of the capacitor 4.

Figure 16:
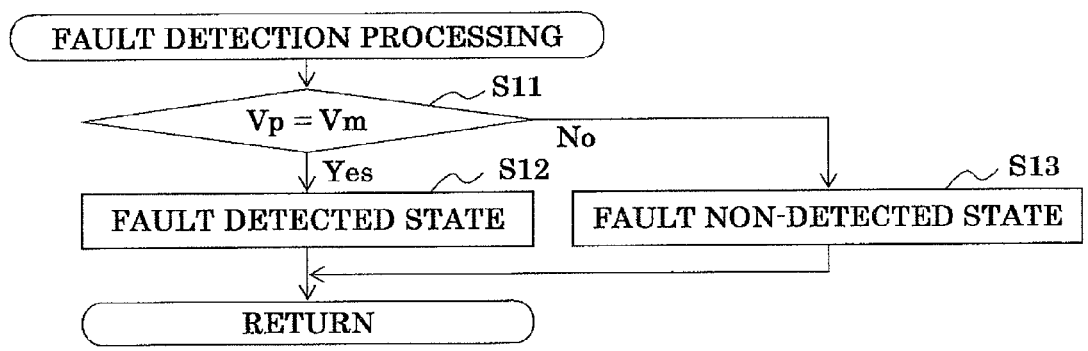
FIG. 16 is a flowchart of fault detection processing in the sixth embodiment.

Now, operations are described. FIG. 16 is a flowchart showing a schematic processing procedure of fault detection processing. Comparison is made between a positive pole-side voltage Vp and negative pole-side voltage Vm of the capacitor (S11), and in the case of coincidence, the short-circuit fault is determined to occur at the capacitor and it is set to be in the state of fault detection (S12). In the case of no coincidence between the positive pole-side voltage Vp and the negative pole-side voltage Vm, the capacitor is determined operating normally and it is set to be in the state of no fault detection (S13). Incidentally, although the short-circuit fault is to be detected from the positive pole-side voltage and negative pole-side voltage of the capacitor in this embodiment, means for use in detecting the short-circuit fault of the capacitor is not limited to this one, but may be other means.

Now, after the fault detection processing, operation goes to power generation control instruction processing, and the processing procedure of power generation control instruction processing in this case is the same as in the flowchart of FIG. 7 showing the second embodiment. That is, in the case that it is determined to be in the state of fault detection in fault detection processing, an instruction is given to the generator controller so as to stop the power generation of the generator.

By processing as described above, owing to that the short-circuit fault of the power source apparatus on the high-voltage system side is detected, and in the case of detection of the short-circuit fault of the power source apparatus, the power generation of the generator is stopped, it is possible to prevent situation of the short circuit in the power source system caused by the conduction of power generation of the generator.

Embodiment 7

Figure 17:
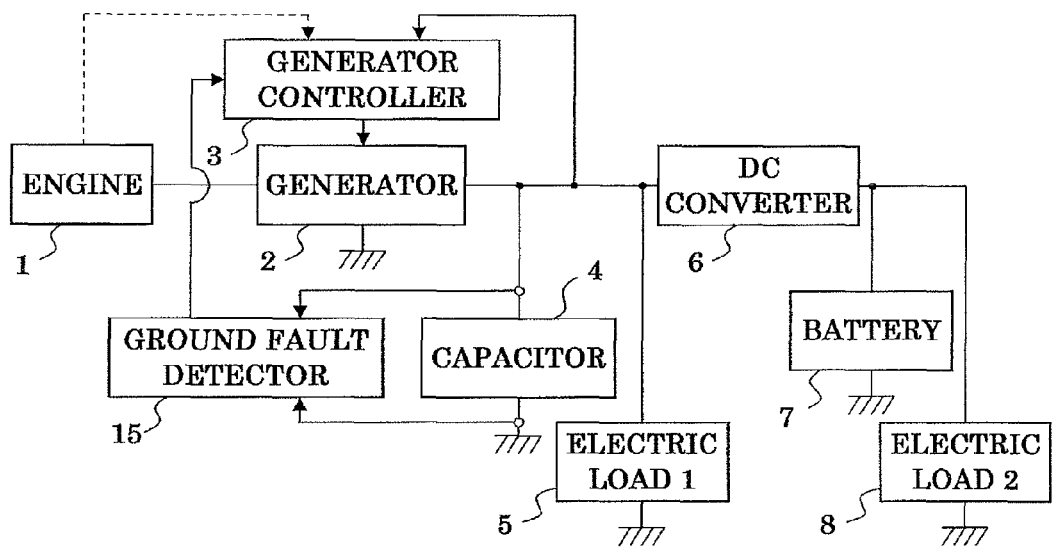
FIG. 17 is a schematic diagram of processing in the seventh embodiment.

Now, a seventh embodiment according to the present invention is described with reference to FIG. 17 showing a processing schematic diagram of this embodiment. In the drawings, the same reference numerals designate like parts as in FIG. 1. Reference numeral 15 designates a ground fault detector detecting a ground fault of the capacitor 4, and from results thereof, giving an instruction to the generator controller 3.

Figure 18:
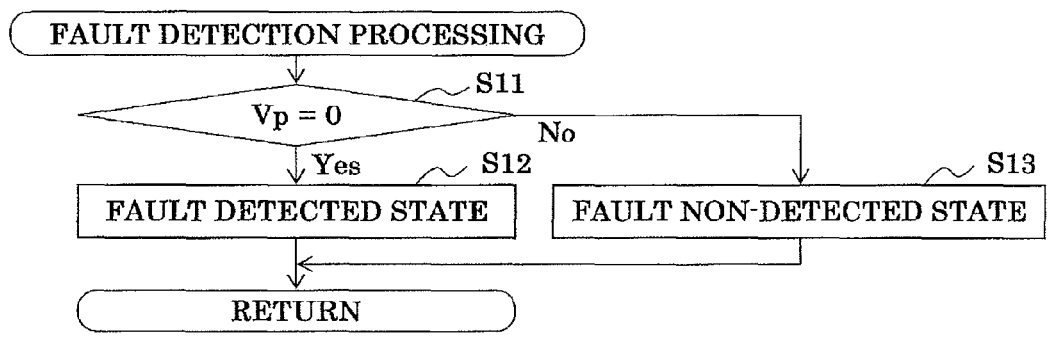
FIG. 18 is a flowchart of fault detection processing in the seventh embodiment.

Now, operations are described. FIG. 18 is a flowchart showing the schematic processing procedure of the ground fault detector in this embodiment. In this embodiment, in the case that a positive pole-side voltage Vp of the capacitor is 0V (S11), the ground fault is determined to occur at the capacitor and it is set to be in the state of fault detection (S12). In the case that the positive pole-side voltage Vp is larger than 0V, the capacitor is determined operating normally and it is set to be in the state of no fault detection (S13). Incidentally, although the ground fault is to be detected from the positive pole-side voltage of the capacitor in this embodiment, means for use in detecting the ground fault of the capacitor is not limited to this one, but may be other means.

Also in this case, the processing procedure of power generation control instruction processing is the same as that in the preceding embodiments, such that further description thereof is omitted. By processing as described above, owing to that the ground fault at the positive pole of the power source apparatus on the high-voltage system side, and in the case of detection of the ground fault at the positive pole of the power source apparatus, the power generation of the generator is stopped, it is possible to prevent situation of the short circuit in the power source system caused by the conduction of power generation of the generator.

Embodiment 8

Figure 19:
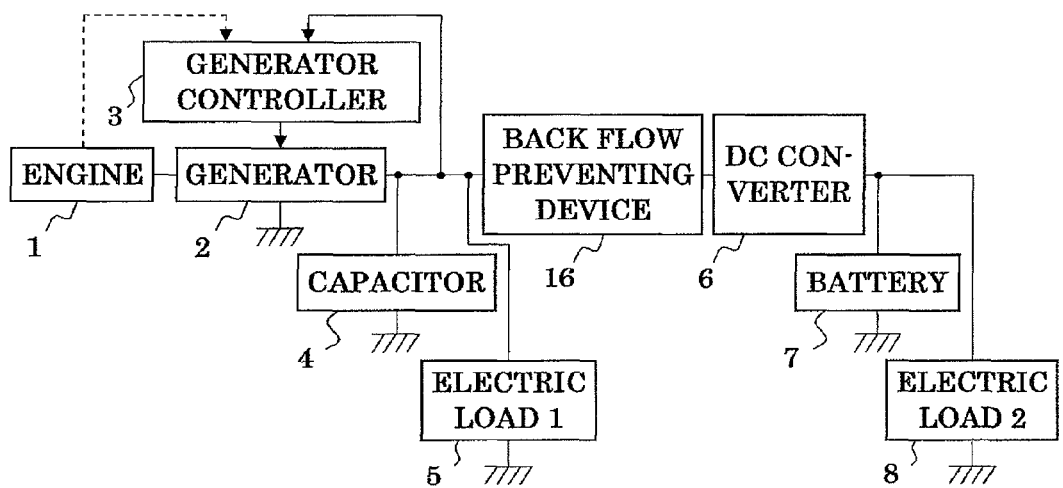
FIG. 19 is a schematic diagram of processing in the eighth embodiment.

Hereinafter, an eighth embodiment according to the present invention is described with reference to FIG. 19. FIG. 19 is a processing schematic diagram in this embodiment. In the drawings, the same reference numerals designate like parts as in FIG. 1. Reference numeral 16 designates a back flow preventing device preventing the back flow from the low-voltage system to the high-voltage system.

Now, advantages of the back flow preventing device are described. In the case that the electric potential of the battery 7 is higher than the electric potential of the capacitor 4, an electric current flows from the battery 7 to the capacitor 4 via the DC converter 6. When inserting the back flow preventing device 16 between the battery 7 and the capacitor 4, even in the case that the electric potential of the battery is higher than the electric potential of the capacitor, there is no occurrence of the back flow via the DC converter 6. Incidentally, although a diode is supposed as the back flow preventing device in this embodiment, means for use is not limited to this one, but may be other means.

By processing as described above, it is prevented that the occurrence of the back flow of an electric power from the low-voltage system to the high-voltage system via the DC converter, and in the case that the electric potential of the power source apparatus on the low-voltage system side is higher than that of the power source apparatus on the high-voltage system side, it is possible to prevent such situation that an electric power unnecessarily flows from the low-voltage system to the high-voltage system, thereby the power supply to an electric load is insufficient and eventually the operation of the electric load comes to be unstable; as well as under the situation that the power source system is brought in the short circuit due to faults of the power source apparatus on the high-voltage system side, it is possible to separate the high-voltage system side, and thus to protect the low-voltage system to continue the operation of the electric load.

While the presently preferred embodiments of the present invention have been shown and described, it is to be understood that these disclosures are for the purpose of illustration and that various changes and combinations may be made without departing from the scope of the invention as set forth in the appended claims.

What is claimed is:

1. A power supply system comprising:
   a generator which is driven by an internal combustion engine or other power source;
   a generator controller which controls an amount of electric power generated by said generator based on an output voltage from said generator;
   a first power source apparatus which is charged by the electric power generated by said generator;
   a DC converter which converts the electric power generated by said generator;
   a second power source apparatus which is charged by the electric power converted by said DC converter;
   an electric load which is operated by the electric power converted at said DC converter;
   an input/output short-circuit detector which detects a short-circuit between an input of said DC converter and an output of said DC converter due to a fault in an internal part of said DC converter; and
   an open-circuit fault detector which detects an open-circuit fault at a positive pole or negative pole of said first power source apparatus,
   wherein said second power source apparatus and said electric load comprise a load circuit arrangement,
   wherein when said input/output short-circuit detector detects a fault of said DC converter, said input/output short-circuit detector instructs said generator controller such that said generator is switched to generate power at a predetermined constant voltage which is determined based on a voltage of said load circuit arrangement, and
   wherein when said open-circuit fault detector detects a fault of said first power source apparatus, said open-circuit fault detector instructs said generator controller such that said generator is switched to generate power at a predetermined constant voltage which is determined based on a voltage of said load circuit arrangement.

2. The power supply system as recited in claim 1, further comprising an output over-voltage detector which detects an output over-voltage due to a fault in an internal part of said DC converter.

3. The power supply system as recited in claim 2, further comprising an output over-current detector which detects an output over-current due to a fault in an internal part of said DC converter.

4. The power supply system as recited in claim 3, further comprising an over-heat detector which detects an over heat condition of said DC converter due to a fault in an internal part of said DC converter.

5. The power supply system as recited in claim 1, further comprising a short-circuit fault detector which detects a short-circuit fault of said first power source apparatus.

6. The power supply system as recited in claim 5, further comprising a ground fault detector which detects a ground fault at a positive pole of said first power source apparatus.

7. A power supply system comprising:
a generator which is driven by an internal combustion engine or other power source;
a generator controller which controls an amount of electric power generated by said generator based on an output voltage from said generator;
a first power source apparatus which is charged by the electric power generated by said generator;
a DC converter which converts the electric power generated by said generator;
a first circuit arrangement comprising said generator and said first power source apparatus;
a second power source apparatus which is charged by the electric power converted by said DC converter;
an electric load which is operated by the electric power converted by said DC converter;
a second circuit arrangement comprising said second power source apparatus and said electric load;
a back flow preventing device which prevents a back flow of electric power from said second circuit arrangement to said first circuit arrangement via said DC converter; and
an input/output short-circuit detector which detects a short-circuit between an input of said DC converter and an output of said DC converter due to a fault in an internal part of said DC converter,
wherein when said input/output short-circuit detector detects a fault of said DC converter, said input/output short-circuit detector instructs said generator controller such that said generator is switched to generate power at a predetermined constant voltage which is determined based on a voltage of said second circuit arrangement.

* * * * *